United States Patent [19]

Yung-Kuan

[11] Patent Number: 4,572,060
[45] Date of Patent: Feb. 25, 1986

[54] COFFEE BOILER WITH AN AUTOMATIC FEEDING DEVICE

[76] Inventor: Wei Y. Yung-Kuan, No. 1, Lane 970, Sec 2, pen tien St., Tainan, Taiwan

[21] Appl. No.: 663,545

[22] Filed: Oct. 22, 1984

[51] Int. Cl.[4] ............................................. A47J 31/00
[52] U.S. Cl. ..................................... 99/280; 99/285; 99/289 R
[58] Field of Search ...................... 99/289 R, 279, 280, 99/281, 282, 283, 285, 286; 426/433

[56] References Cited

U.S. PATENT DOCUMENTS

| | | | |
|---|---|---|---|
| 1,470,584 | 10/1923 | Kreutz | 99/289 |
| 2,517,073 | 8/1950 | Alvarez | 99/289 |
| 3,941,042 | 3/1976 | Wells | 99/289 |

Primary Examiner—Robert W. Jenkins
Attorney, Agent, or Firm—Holman & Stern

[57] ABSTRACT

This invention concerns about an automatic coffee boiler, especially one that can feed automatically a certain amount of coffee powder and boil the coffee powder with a certain quantity of water vapor previously fixed. Its main characteristics is to use two time adjusters in a controlled circuit to respectively set a period of time for activating a coffee feeding device and an electric heater in water tank, and also to use a sequence controlling circuit which can automatically activate in sequence the coffee powder feeder, the heater in the water tank and a music alarm. Through the above-mentioned devices, coffee powder can be automatically fed out and boiled with vapor to become liquid coffee ready for drinking.

One of the other specialities of this invention is that an electromagnetic valve set at the outlet of the coffee feeding device is able to act simultaneously with said coffee feeding device. As said feeding device starts acting, said electromagnetic valve immediately pulls a vertical lid off the powder outlet to let coffee powder fall down through the outlet, and as said feeding device stops acting, said electromagnetic valve is released pushing the vertical lid to the outlet to shut it right away so that the coffee powder stored in will not be moistened to stick on the wall of the storing bottle. In addition, on the bottom of this automatic boiler a pressure switch is set to control the action of an electric heater is still filled with some liquid coffee, its weight may press said pressure switch to cause said electric heater to heat up the coffee pot keeping it warm.

2 Claims, 3 Drawing Figures

COFFEE BOILER WITH AN AUTOMATIC FEEDING DEVICE

BACKGROUND OF THE INVENTION

The coffee boiler usually used today is fed with coffee powder to its storing tank by hand, then its water tank is filled with a certain amount of water which is next boiled by an electric heater becoming vapor and flowing into the storing tank boiling the coffee powder to make liquid coffee for drinking. The above-mentioned coffee boiler must be fed with coffee powder and filled with water every time when it is used. It is very bothering.

Though a kind of automatic feeding coffee boiler was ever designed, it has never been widely spreaded, since part of the coffee powder stored in the tank was easily melted by the heat transfered by water vapor during or after boiling, and the spoiled powder stuck on the wall of said tank to retard cleaning. In order to provide an improved coffee boiler the inventor has worked hard for a few years and finally worked out this coffee boiler with an automatic feeding device.

DETAILED DESCRIPTION OF THE INVENTION

A preferred embodiment of this invention describing its characteristics, purposes and functions is to detailedly illustrated as follows.

Figure 1:
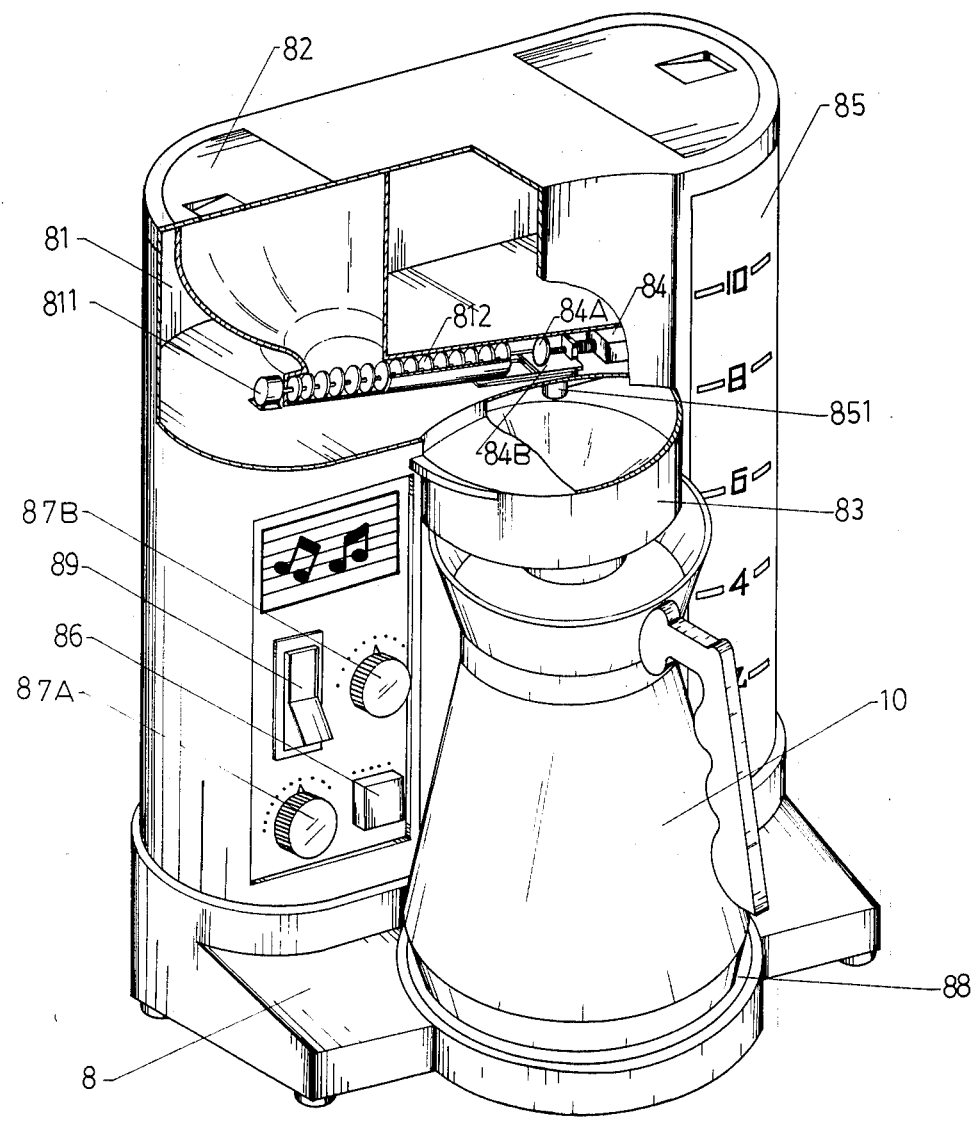
FIG. 1 is the structural view of the coffee boiler with an automatic feeding device in this invention.
Figure 2:
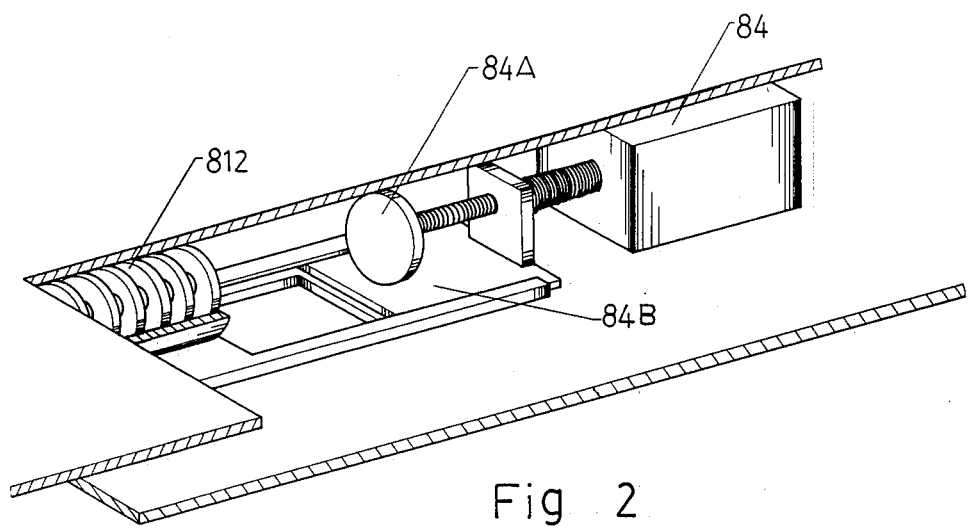
FIG. 2 is the cross-sectional view of the electromagnetic valve in this invention.

As shown in FIG. 1, it is a structural view of this preferred embodiment. On top of coffee boiler 8 is placed coffee storing bottle 81 which is attached with a cover on its top for filling coffee powder and with a feeding device on its bottom as well. Said feeding device comprises switch 86 and adjusting buttom 87A which are set to control the action of motor 811 to rotate screw transporter 812, which totates to feed out a proper quantity of coffee powder through an outlet into vaporizing bowl 83. In addition, at the outlet of said feeding device, electromagnetic valve 84 is set to act together with said motor 811. In FIG. 2, vertical lid 84A attached with said electromagnetic valve 84 is used to close or open the outlet of said screw transporter 812 and horizontal lid also attached with said valve 84 is used to close or open the hole in the cover laid on vaporing bowl 83.

when said motor 811 starts to act, said electromagnetic valve 84 also activates to feed out coffee powder down into said bowl 83 and when said motor 811 stops acting, said electromagnetic valve 84 immediately activates to push the vertical lid and the horizontal lid closing both the outlet and the hole in the cover in order that the water vapor in said bowl 82 will not flow through said outlet and the hole into said coffee storing bottle to moisten the coffee powder therein. Next, as said feeding device stops acting said switch 86 may automatically cause an electric heater (not shown in the Figure) in water tank 85 to start acting through a time delay circuit. Said electric heater is able to boil the water in said tank 85, which vaporizes flowing through pipe 851 into said vaporizing bowl 83 to dissolve the coffee powder in it, which may then drops down through a filter (not shown in the Figure) at the bottom of said vaporizing bowl 83 into coffee pot 10. The length of working time of said electronic heater is set by handling adjusting button 87B. Furthermore, as said electric heater stops acting, (that means, vaporizing work has been finished), through an another time delay circuit, an alarm is automatically started to sound telling that coffee is ready for drinking. What's more, a pressure switch set at the bottom of said coffee boiler 8 is used to control electric heater 88. That is, if there is still some coffee left in said coffee pot 10, which is placed on said electric heater 88, said pressure switch will automatically turn on to make said electric heater 88 heat up so as to attain the purpose of keeping the coffee in pot 10 hot. Additionally, this invention also includes power switch 89 for controlling the whole circuits therein.

Figure 3:
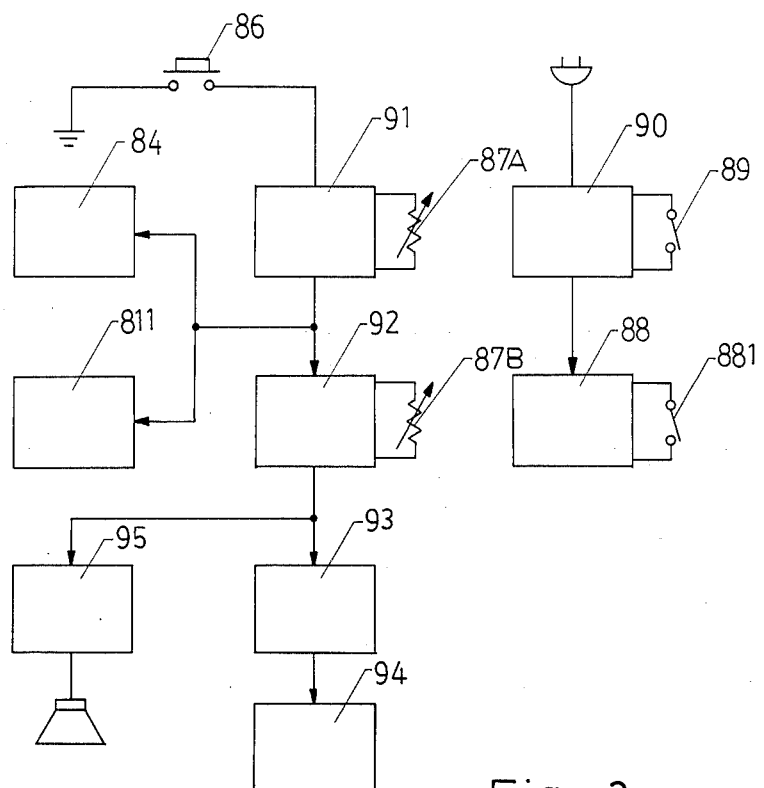
FIG. 3 is the circuit diagram used in the coffee boiler with an automatic feeding device in this invention.

FIG. 3 shows the circuit diagram of the embodiment shown in FIG. 1. The main circuit diagram includes power circuit 90, time delay circuits 91,92, driving circuit 93, and alarm circuit 95. Said power circuit 90 is designed to provide power for the whole coffee boiler and power switch 89 is set on its top as a whole power switch. When said switch 86 is turned on, said time delay circuit 91 is started to control the period of acting time of said electromagnetic valve 84 and said motor 811, and the period of time is adjusted by said adjusting button 87A. As soon as said time delay circuit 91 has finished action, said electromagnetic valve and said motor 811 are to be turned off and in turn said time delay circuit 92 is immediately started up to control the peroid of acting time of said electric heater 94, and the period of its acting time can be adjusted by said adjusting button 87B. Said driving curcuit 93 is used to provide more power for said heater 94. When said time delay circuit 92 has finished its action, said driving circuit 93 is opened to stop said heater 94 from acting and at the same time to start up said music alarm circuit 95 to sound the alarm for a short period of time. Said pressure switch 881 set under the bottom of said electric heater 88 can be pressed and turned on to make said electric heater 88 acting to keep warm the coffee left in said coffee pot 10 placed on said eletric heater 88. If said coffee pot 10 is empty, its weight is not heavy enough to activate said pressure switch, so said electric heater 88 cannot hrat up.

What is claimed is:

1. In a machine for making hot beverages having a hopper for beverage grounds, a motor driven screw conveyor for delivering grounds from the hopper into a beverage mixing chamber, and delivery means for delivering hot water to the mixing chamber, the mixing chamber having an outlet for delivery into a beverage flask or the like, the improvement wherein the screw conveyor has a tubular casing with an outlet end located above an inlet leading into the mixing chamber, the machine including an electrically operated reciprocatory member having a disk portion providng a first valve for selectively opening and closing against the outlet end of the conveyor casing and a plate portion providing a second valve for simultaneously sliding over the mixing chamber inlet, and electric circuit means for controlling the reciprocatory member so as to simultaneously open the conveyor outlet and the mixing chamber inlet in unison to supply grounds to the mixing chamber and subsequently to simultaneously close the conveyor outlet and mixing chamber inlet in unison, the first and second valves inhibiting heated water vapor in the mixing chamber from entering the screw conveyor and grounds hopper.

2. The invention of claim 1 wherein the beverage maker includes a base heater for the flask or the like and timer controls for the motor and delivery means included in the circuit means.

* * * * *